United States Patent
Gross et al.

(10) Patent No.: US 9,983,566 B2
(45) Date of Patent: May 29, 2018

(54) PART INSPECTION SYSTEM AND METHOD

(71) Applicant: The Boeing Company, Chicago, IL (US)

(72) Inventors: Brenda C. Gross, Tacoma, WA (US); John W. Dorsey-Palmateer, Daniel Island, SC (US); Timothy G. Nielsen, Kent, WA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 14/958,488

(22) Filed: Dec. 3, 2015

(65) Prior Publication Data

US 2017/0160719 A1 Jun. 8, 2017

(51) Int. Cl.
*G05B 19/406* (2006.01)

(52) U.S. Cl.
CPC .. *G05B 19/406* (2013.01); *G05B 2219/32179* (2013.01)

(58) Field of Classification Search
None
See application file for complete search history.

(56) References Cited

U.S. PATENT DOCUMENTS

| | | | | |
|---|---|---|---|---|
| 5,552,992 A * | 9/1996 | Hunter | ............... | G05B 19/4099 345/420 |
| 5,880,961 A * | 3/1999 | Crump | .................. | G06T 17/00 700/112 |
| 6,091,999 A * | 7/2000 | Crump | .................. | G06T 17/00 700/112 |
| 6,486,963 B1 * | 11/2002 | Holec | ................... | G01B 11/24 356/601 |
| 6,501,554 B1 * | 12/2002 | Hackney | ................ | G01B 11/00 356/601 |
| 6,522,777 B1 * | 2/2003 | Paulsen | ............. | G01B 11/2513 356/237.2 |
| 6,539,107 B1 | 3/2003 | Michael et al. | | |
| 7,024,343 B2 | 4/2006 | El-Ratal | | |
| 7,194,326 B2 * | 3/2007 | Cobb | ............... | G05B 19/41805 700/114 |
| 7,555,404 B2 * | 6/2009 | Brennan | ................. | B29C 70/32 156/64 |
| 8,401,827 B2 | 3/2013 | Patnala | | |

(Continued)

*Primary Examiner* — Ramesh Patel
(74) *Attorney, Agent, or Firm* — Miller, Matthias & Hull LLP

(57) ABSTRACT

Systems and methods of inspecting a manufactured part include creating a computer model of the part with a desired model contour having a model feature at a desired location. The manufactured part is scanned to obtain scanned data indicative of a manufactured surface formed in a manufactured contour and having a manufactured feature at an actual location on the manufactured surface. The computer model is modified using modeled reaction forces so that the model contour matches the manufactured surface. A determination whether the manufactured part is acceptable is based on a comparison of the actual location of the manufactured feature with and the desired location of the model feature with the model surface in the modified model contour. Additionally or alternatively, the reaction forces are compared with a reaction force threshold to determine whether the manufactured part requires reworking.

19 Claims, 4 Drawing Sheets

(56) References Cited

U.S. PATENT DOCUMENTS

| 2004/0122630 | A1  | 6/2004 | Fife |
|---|---|---|---|
| 2007/0050741 | A1* | 3/2007 | Ogawa ..................... G03F 1/36 716/52 |
| 2010/0161287 | A1* | 6/2010 | Sauerhoefer ........... G01B 21/04 703/1 |
| 2013/0238109 | A1* | 9/2013 | Romanelli ......... G05B 19/4187 700/97 |

* cited by examiner

PART INSPECTION SYSTEM AND METHOD

FIELD

The present disclosure generally relates to part inspection and, more specifically, to systems and methods of using metrology during inspection.

BACKGROUND

When fabricating parts, it is often important to ensure that the parts are formed with the correct size and shape, as well as features formed on the parts are in the correct position. Current inspection methods for ensuring proper part size, shape, and feature location are typically labor intensive, particularly when the part is relatively large and/or formed of a flexible material. When inspecting a skin used for an aircraft wing, for example, a template may be used that is marked with the proper dimensions and feature locations that is laid over the manufactured part. This process requires the part to be removed from a part conveying carrier and positioned such that it is accessible by workers to place the template over the part. After checking the part, it must then be returned to the carrier for other processes. Removing the part from the carrier, performing the template check, and returning the part to the carrier are performed manually, increasing the time and expense needed to inspect the part.

SUMMARY

In accordance with one aspect of the present disclosure, a method is provided of inspecting a manufactured part that includes creating a computer model including a model surface formed in a desired model contour and having a model feature at a desired location on the model surface, and scanning the manufactured part to obtain scanned data indicative of a manufactured surface formed in a manufactured contour and having a manufactured feature at an actual location on the manufactured surface. The method further includes applying modeled reaction forces to the computer model that are sufficient to obtain a modified model surface having a modified model contour matching the scanned data indicative of the manufactured surface in the manufactured contour. A determination whether the manufactured part is acceptable based on a comparison of the actual location of the manufactured feature of the manufactured part with the manufactured surface in the manufactured contour, and the desired location of the model feature of the computer model with the model surface in the modified model contour.

In accordance with another aspect of the present disclosure, a method is provided of inspecting a manufactured part that includes creating a computer model including a model surface formed in a desired model contour, scanning the manufactured part to obtain scanned data indicative of a manufactured surface formed in a manufactured contour, and applying modeled reaction forces to the computer model sufficient to obtain a modified model surface having a modified model contour matching the scanned data indicative of the manufactured surface in the manufactured contour. The method further includes determining whether the reaction forces needed to obtain the modified model contour exceed a reaction force threshold, and, when the reaction forces exceed the reaction force threshold, designating the manufactured part for rework.

In accordance with a further aspect of the present disclosure, a system for inspecting a manufactured part includes a carrier supporting the manufactured part, the manufactured part including a manufactured surface formed in a manufactured contour and having a manufactured feature at an actual location on the manufactured surface. A scanner is positioned relative to the carrier and configured to obtain scanned data indicative of the manufactured surface formed in the manufactured contour and the actual location of the manufactured feature on the manufactured surface. A computer modeling module is configured to create a computer model including a model surface formed in a desired model contour and having a model feature at a desired location on the model surface. A lofting module is configured to receive the scanned data and the computer model, and apply modeled reaction forces to the computer model sufficient to obtain a modified model surface having a modified model contour matching the manufactured contour of the manufactured surface. A comparator module is configured to compare the actual location of the manufactured feature of the manufactured part with the manufactured surface in the manufactured contour to a desired location of the model feature of the computer model with the model surface in the modified model contour.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
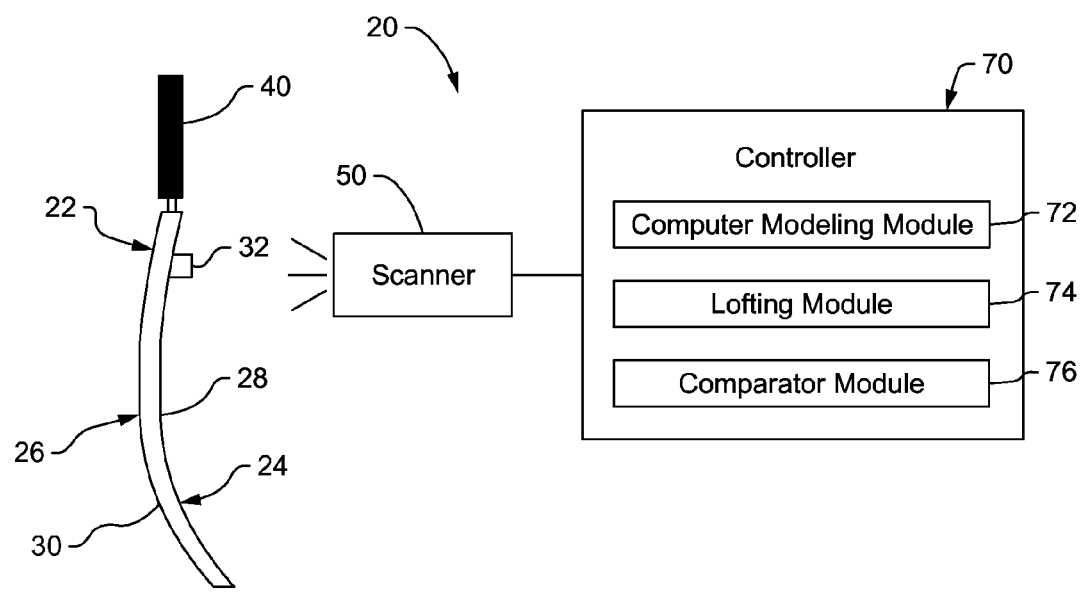
FIG. 1 is a schematic illustration of one exemplary part inspection system of the present disclosure.

FIG. 1 illustrates a system 20 for inspecting a manufactured part 22. In the embodiments described herein, the manufactured part 22 is a skin for an aircraft wing that is formed of a metallic material. It will be appreciated, however, that the systems and methods disclosed herein may be used with parts other than aircraft wing skins and formed of materials other than metal. In the illustrated embodiment, the manufactured part 22 includes manufactured surfaces, such as an inside mold line 24 and an outside mold line 26. The manufactured surfaces are formed with three-dimensional shapes, defined herein as manufactured contours 28, 30. Still further, a manufactured feature may be located on at least one of the manufactured surfaces. As shown in FIG. 1, for example, a manufactured feature 32 is formed on the inside mold line 24 of the manufactured part 22. The manufactured feature 32 may take any one of several forms, including pad-ups, which are localized areas of greater thickness, or cut-outs, which are voids that may extend partially or entirely through the manufactured part 22.

The system 20 may include a carrier for supporting the manufactured part 22. In the illustrated embodiment, the carrier is provided as a transfer rail 40 configured to support the manufactured part 22 from above, so that the manufactured part 22 hangs downwardly from the transfer rail 40 in a hanging configuration. The transfer rail 40 may be adapted for movement along a rail path, so that movement of the transfer rail 40 advances the manufactured part 22 along a predetermined part path. The transfer rail may have a length sufficient to accommodate the size of the part. For example, in some embodiments, the transfer rail may have a length of 120 feet or more.

The system 20 may further include a scanner 50 for detecting an actual shape of the manufactured part 22. As schematically illustrated in FIG. 1, the scanner 50 is positioned relative to the transfer rail 40 and may be a three-dimensional laser scanner configured to obtain scanned data indicative of at least one of the manufactured surfaces formed in the manufactured contours 28, 30 and a location of the manufactured feature 32. This data represents the actual contours and feature location of the manufactured part 22 as fabricated. Additionally, while not shown in the drawings, the system 20 may further include an auxiliary metrology system for tracking the location of the scanner 50 relative to the manufactured part 22.

Figure 2:
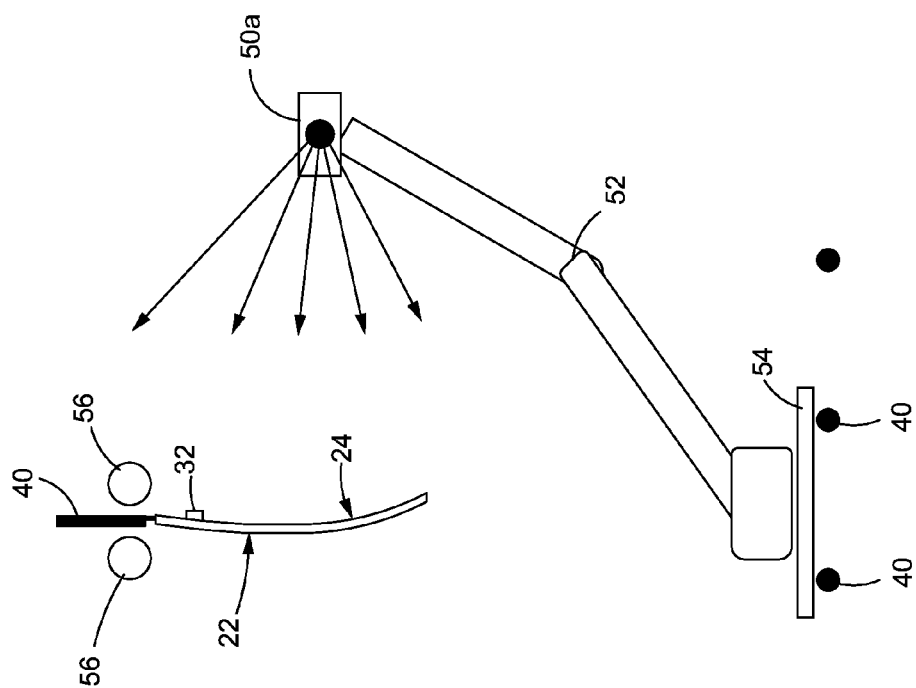
FIG. 2 is a schematic illustration of an exemplary part inspection system of the present disclosure having a laser radar scanner.

The scanner 50 may be configured to directly scan the manufactured contour, such as a laser radar scanner 50a illustrated in FIG. 2. The laser radar scanner 50a is configured to directly determine positional X, Y, and Z coordinates of several points along the manufactured part 22, from which the contour of at least one surface of the manufactured part 22 may be determined. Additionally, by determining the actual contour of the manufactured part 22, the location of the manufactured feature 32 may be identified. The laser radar scanner 50a may be positioned relative to the transfer rail 40 by a robot arm 52 supported on a movable base rail 54. Scan targets 56 may be provided at discrete locations adjacent the transfer rail 40 to provide reference points for the scanned data.

Figure 3:
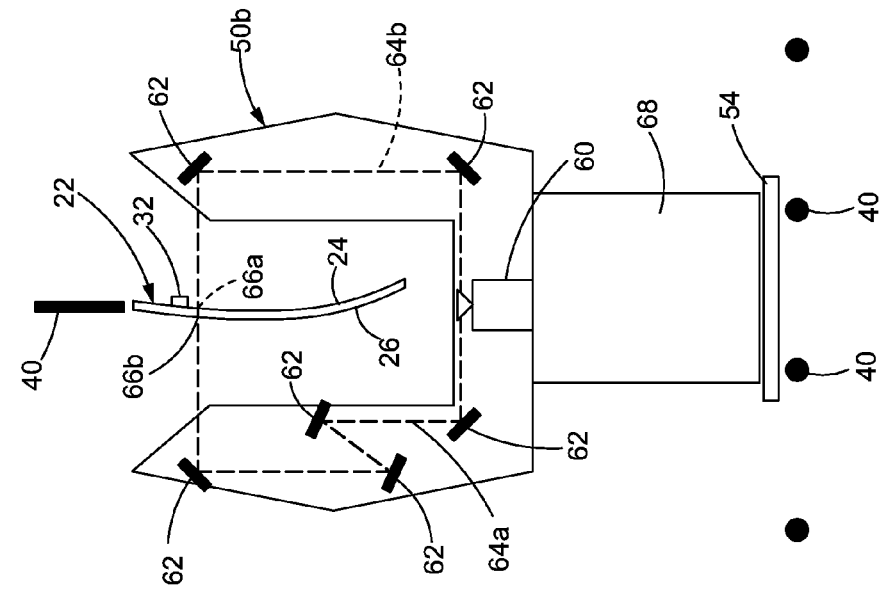
FIG. 3 is a schematic illustration of an exemplary part inspection system of the present disclosure having a horseshoe scanner.

Alternatively, the scanner 50 may be configured to measure both a position and a thickness of discrete points along the manufactured part 22, such as the horseshoe scanner 50b illustrated in FIG. 3. In this embodiment, the horseshoe scanner 50b includes a ring laser radar 60 with mirrors 62 that form asymmetric laser paths 64a, 64b to aligned target points 66a, 66b on the manufactured part 22. Thus, the horseshoe scanner 50b identifies not only the positional X, Y, and Z coordinates of the target points 66a, 66b, but also a thickness of the manufactured part 22 may be determined by comparing the locations of the target points 66a, 66b. The horseshoe scanner 50b is then repositioned to obtain position and thickness data at additional target points until the entire manufactured part 22 has been scanned. The horseshoe scanner 50b may be supported by a lifting/translation unit 68 configured to raise/lower the horseshoe scanner 50b in the vertical direction as well as laterally move the horseshoe scanner 50b in a horizontal direction, thereby to reposition the horseshoe scanner 50b to obtain data from multiple target points. Additionally, the lifting/translation unit 68 may be supported on a movable base rail 54 to adjust a position of the horseshoe scanner 50b in a longitudinal direction. Once thickness data is obtained from the multiple target points, the location of the manufactured feature 32 may be determined by identifying a location where the thickness of the manufactured part 22 varies. For example, an area of increased thickness would indicate the location of a pad-up feature while an area of decreased thickness would indicate the location of a cut-out feature.

The system 20 may further include one or more controllers 70 for determining whether the manufactured contour and/or actual location of the manufactured feature are acceptable. As schematically illustrated in FIG. 1, a controller 70 is in electrical communication with the scanner 50. The controller 70 may be implemented using any one or more of a processor, a microprocessor, a microcontroller, a field programmable gate array (FPGA), a programmable read-only memory (PROM), or any other device that can be operated in accordance with preprogrammed instructions and/or algorithms disclosed herein. In the exemplary embodiment, the controller 70 may be preprogrammed according to one or more algorithms generally categorized into a computer modeling module 72, a lofting module 74, and a comparator module 76. While the modules are shown in FIG. 1 as being embodied in a single controller 70, it will be appreciated that they may be provided in separate controllers, each of which is directly or indirectly in electronic communication with each other.

Figure 4:
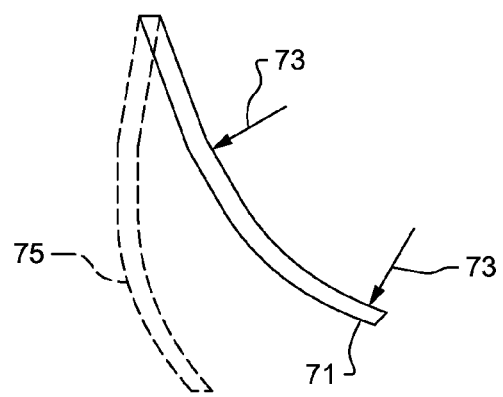
FIG. 4 is a graphical illustration of a computer model of a part in both a desired configuration and a modified configuration.

The computer modeling module 72 may be configured to create a computer model of a part that includes a model surface formed in a desired model contour and a model feature located on the model surface. For example, as schematically illustrated in FIG. 4, the desired model contour 71 may represent the shape of the part when the part is in a desired configuration. In some embodiments, the computer modeling module comprises a CAD module configured to create a finite element analysis model of the model surface formed in the desired model contour and having the model feature at the desired location.

The lofting module 74 is in direct or indirect electronic communication with the scanner 50 and the computer modeling module 72, and is configured to receive the scanned data and the computer model and adjust the computer model to match the scanned data. As used herein, the term "loft" is used to indicate morphing, skewing, or other manipulation of the shape of a model contour. More specifically, the computer model from the computer modeling module 72 identifies the desired contours and feature locations of the part when the part is in the desired configuration. The scanned data, however, may indicate the actual contours and actual location of the manufactured feature 32 with the manufactured part 22 in a configuration that is different from the desired configuration, identified herein as the manufactured contour. In some embodiments, the manufactured contour is a hanging contour when the scanned data is taken with the manufactured part 22 hanging from the transfer rail 40. The lofting module 74, therefore, is configured to apply modeled reaction forces, represented in FIG. 4 by arrows 73, to the computer model until the model surface of the computer model has a modified model contour 75 that matches the manufactured contour of the manufactured surface, as identified by the scanned data. As used herein, the term "reaction forces" is used to identify forces to negate the effect of gravity on the shape of the manufactured part 22 when hanging from the transfer rail 40, forces designed to mimic pull-up forces along wing chords, or other forces under which the manufactured part 22 may be placed when assembled.

The comparator module 76 is in direct or indirect electronic communication with the scanner 50 and the lofting module 74, and is configured determine whether the part as manufactured meets quality control standards. More specifically, the comparator module 76 is configured to compare the actual location of the manufactured feature of the manufactured part 22, with the manufactured surface in the manufactured contour, to a desired location of the model feature of the computer model with the model surface in the modified model contour. Based on this comparison, the comparator module 76 may determine whether the actual location is within a predetermined location threshold of the desired location. Additionally or alternatively, the comparator module 76 may be configured to determine if the manufactured contour is acceptable. More specifically, the comparator module 76 further may be configured to determine whether the reaction forces needed to obtain the modified model contour exceed a reaction force threshold, and to reject the manufactured part (and, optionally, designate the manufactured part for rework) when the reaction forces exceed the reaction force threshold.

Figure 5:
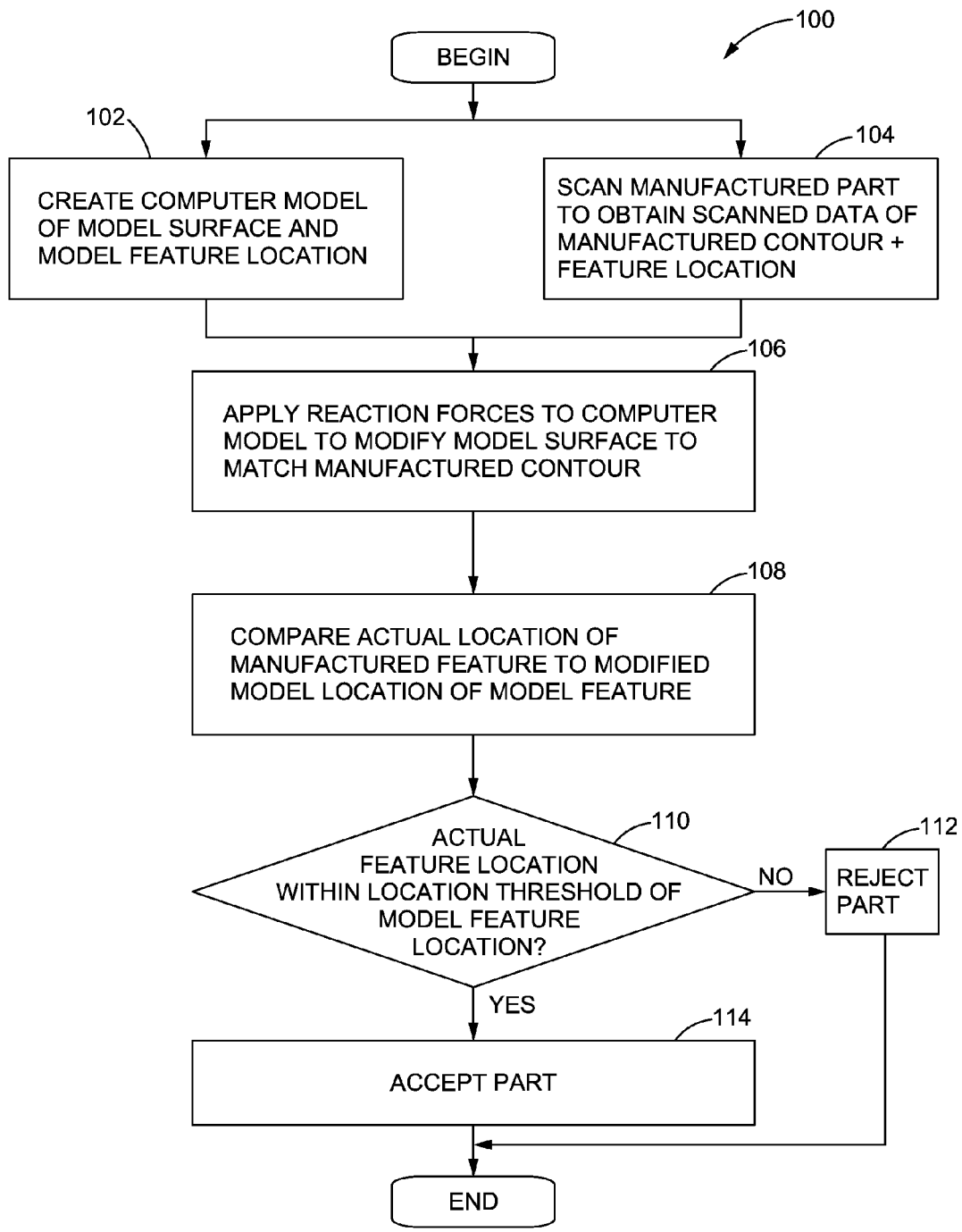
FIG. 5 is a flowchart illustrating one exemplary method of the present disclosure for inspecting parts.

One exemplary algorithm or controller implemented method 100 for inspecting a manufactured part 22 is diagrammatically provided in FIG. 5. As shown, in block 102 the computer modeling module 72 may be configured to create a computer model including a model surface formed in a desired model contour and having a model feature at a desired location on the model surface. The computer model may correspond to the desired part shape when the part is in a desired configuration. Separately, at block 104, the scanner 50 may be configured to scan the manufactured part 22 to obtain scanned data indicative of a manufactured surface formed in a manufactured contour and a manufactured feature at an actual location on the manufactured surface. The scanned data may represent the manufactured part 22 in a configuration other than the desired configuration, such as a hanging configuration when the scanned data is acquired while the manufactured part 22 is suspended from the transfer rail 40.

To resolve any discrepancy between the actual configuration of the part when scanned and the desired configuration of the model, at block 106 the lofting module 74 may receive the computer model and the scanned data, and apply modeled reaction forces to the computer model sufficient to obtain a modified model surface with a modified model contour matching the scanned data indicative of the manufactured surface in the manufactured contour. Thus, the original model contour is modified until it matches the actual, manufactured contour of the manufactured part 22.

With the difference in contour resolved, at block 108 the comparator module 76 may compare the actual location of the manufactured feature 32 of the manufactured part 22 (with the manufactured surface in the manufactured contour) to the desired location of the model feature of the computer model with the model surface in the modified model contour. At block 110, the comparator module 76 may further determine whether the actual location of the manufactured feature 32 is within a location threshold of the model feature location. If the actual location is outside the location threshold, at block 112 the part is rejected, where it may be sent for reworking. Alternatively, if the actual location of the manufactured feature 32 is within the location threshold, the manufactured part 22 is accepted at block 114.

Figure 6:
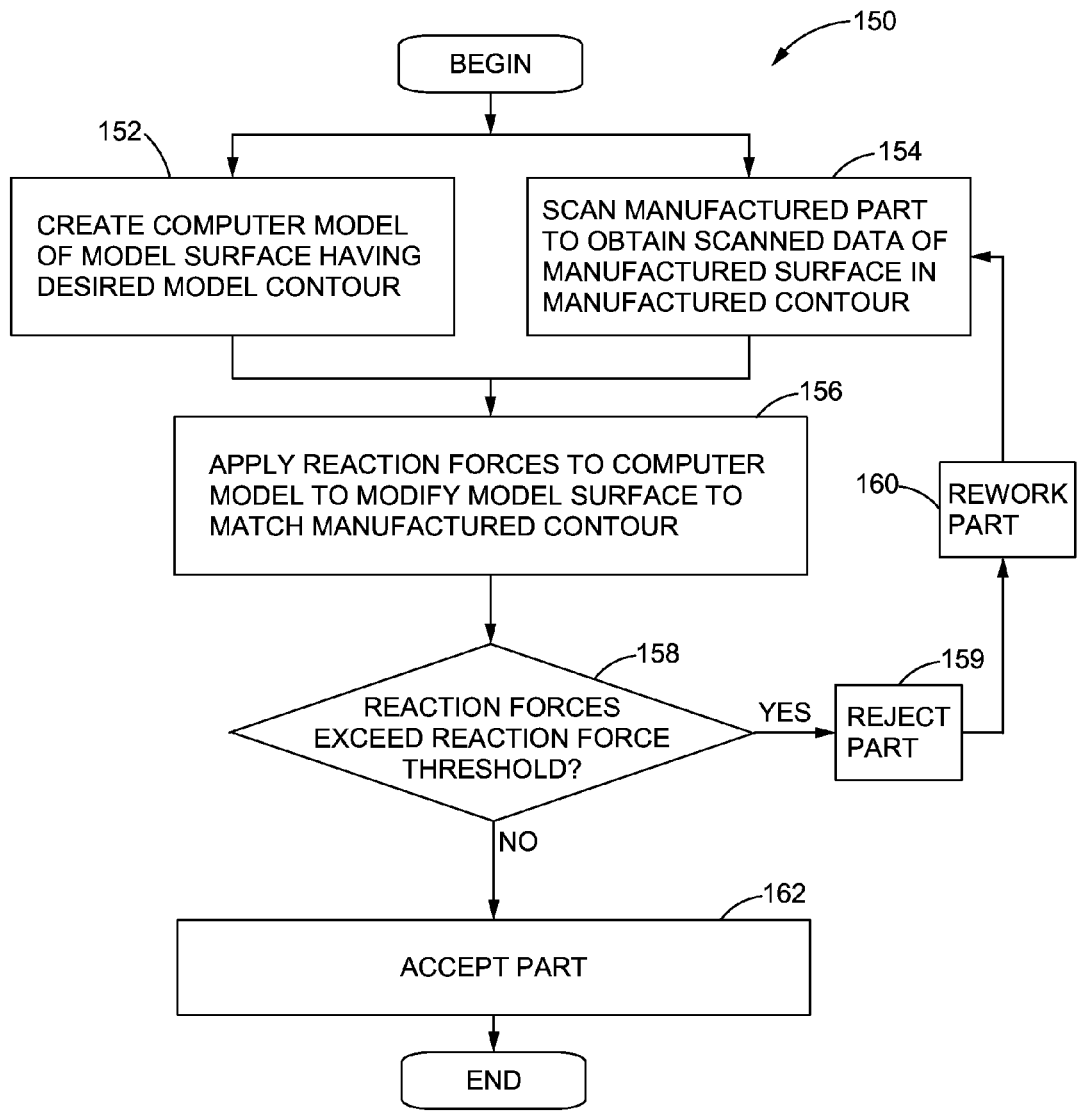
FIG. 6 is a flowchart illustrating another exemplary method of the present disclosure for inspecting parts.

Another exemplary algorithm or controller implemented method 150 for inspecting a manufactured part 22 is diagrammatically provided in FIG. 6, and may be performed alternatively or in addition to the method 100 described above. More specifically, at block 152 the computer modeling module 72 may create a computer model of a part including a model surface formed in a desired model contour. Separately, at block 154, the scanner 50 may scan the manufactured part 22 to obtain scanned data indicative of a manufactured surface of the manufactured part 22 formed in a manufactured contour. At block 156, the lofting module 74 may apply modeled reaction forces to the computer model sufficient to obtain a modified model surface having a modified model contour matching the scanned data indicative of the manufactured surface in the manufactured contour. At block 158, the comparator module 76 may determine whether the reaction forces needed to obtain the modified model contour exceed a predetermined reaction force threshold. If the reaction forces exceed the reaction force threshold, at block 159 the part is rejected. At block 160, the part may be sent for reworking, with the method returning to block 154 where the scanner 50 scans the reworked part. Alternatively, if the reaction forces do not exceed the reaction force threshold, the part is accepted at block 162.

In addition to inspecting the contour of the manufactured part 22, the method 150 may simultaneously or sequentially determine whether an actual location of a manufactured feature 32 is within a location threshold of a model feature location. More specifically, creating the computer model at block 152 may further include creating a model feature located on the model surface. Additionally, scanning the manufactured part at block 154 may further include scanning a manufactured feature located on the manufactured surface. The method 150 may further include comparing an actual location of the manufactured feature of the manufactured part with the manufactured surface in the manufactured contour to a desired location of the model feature of the computer model with the model surface in the modified model contour, thereby to determine whether the actual location of the manufactured feature is acceptable.

Those skilled in the art will appreciate that alternative systems and methods for inspecting parts as described herein may offer numerous benefits over related art. Not only is part inspection at least partially automated, but the above-described systems and methods eliminate the need to move the part from the carrier for inspection, thereby reducing the time and cost devoted to inspecting the part. Additionally, manufactured parts that do not conform to the desired contours or feature location are more readily identified and designated for reworking, thereby reducing overall production time.

What is claimed is:

1. A method of inspecting a manufactured configuration of a manufactured part, comprising:

creating a computer model corresponding to a desired assembled configuration of the manufactured part, the computer model including a model surface formed in a desired assembled model contour and having a model feature at a desired assembled location on the model surface;

scanning the manufactured part to obtain scanned data indicative of the manufactured part in the manufactured configuration, including a manufactured surface formed in a manufactured contour and having a manufactured feature at an actual location on the manufactured surface;

applying modeled reaction forces to the computer model to obtain a modified computer model with a modified model surface having a modified model contour matching the manufactured contour from the scanned data, the modified computer model including a modified location of the model feature different from the desired assembled location of the model feature; and determining whether the manufactured part in the manufactured configuration is acceptable based on a comparison of the actual location of the manufactured feature and the modified location of the model feature of the modified computer model.

2. The method of claim 1, in which the manufactured part comprises an aircraft wing skin, and in which the aircraft wing skin is hanging from a carrier during scanning.

3. The method of claim 1, in which scanning the manufactured part comprises taking a three-dimensional laser scan of the manufactured part.

4. The method of claim 3, in which the scanned data is indicative of a contour of at least one of an outside mold line of the manufactured part and an inside mold line of the manufactured part.

5. The method of claim 3, in which the scanned data is indicative of a thickness of the manufactured part.

6. The method of claim 1, further comprising:
determining whether the modeled reaction forces needed to obtain the modified computer model exceed a reaction force threshold; and
when the modeled reaction forces exceed the reaction force threshold, rejecting the manufactured part.

7. A method of inspecting a manufactured configuration of a manufactured part, comprising:
creating a computer model corresponding to a desired assembled configuration of the manufactured part, the computer model including a model surface formed in a desired assembled model contour;
scanning the manufactured part to obtain scanned data indicative of the manufactured part in the manufactured configuration, including a manufactured surface formed in a manufactured contour;
applying modeled reaction forces to the computer model to obtain a modified computer model with a modified model surface having a modified model contour matching the manufactured contour from the scanned data;
determining whether the modeled reaction forces needed to obtain the modified computer model exceed a reaction force threshold; and
when the modeled reaction forces exceed the reaction force threshold, designating the manufactured part for rework.

8. The method of claim 7, in which the manufactured part comprises an aircraft wing skin, and in which the aircraft wing skin is hanging from a carrier during scanning.

9. The method of claim 7, in which scanning the manufactured part comprises taking a three-dimensional laser scan of the manufactured part.

10. The method of claim 9, in which the scanned data is indicative of a contour of at least one of an outside mold line of the manufactured part and an inside mold line of the manufactured part.

11. The method of claim 10, in which a laser radar scanner is used to obtain the scanned data.

12. The method of claim 7, in which creating the computer model corresponding to the desired assembled configuration of the manufactured part further includes creating a model feature located at a desired assembled location on the model surface, and scanning the manufactured part further includes scanning a manufactured feature located at an actual location on the manufactured surface, the method further comprising comparing the actual location of the manufactured feature to a modified location of the model feature of the modified computer model.

13. A system for inspecting a manufactured part, comprising:
a carrier supporting the manufactured part, the manufactured part having an actual configuration including a manufactured surface formed in a manufactured contour and having a manufactured feature at an actual location on the manufactured surface;
a scanner positioned relative to the carrier and configured to obtain scanned data indicative of the actual configuration of the manufactured part including the manufactured surface formed in the manufactured contour and the actual location of the manufactured feature on the manufactured surface;
a computer modeling module configured to create a computer model corresponding to a desired assembled configuration of the manufactured part, the computer model including a model surface formed in a desired assembled model contour and having a model feature at a desired assembled location on the model surface;
a lofting module configured to receive the scanned data and the computer model, and apply modeled reaction forces to the computer model sufficient to obtain a modified computer model with a modified model surface having a modified model contour matching the manufactured contour from the scanned data, the modified computer model including a modified location of the model feature different from the desired assembled location of the model feature; and
a comparator module configured to compare the actual location of the manufactured feature to the modified location of the model feature of the modified computer model.

14. The system of claim 13, in which the scanner comprises a laser radar scanner.

15. The system of claim 14, in which the scanned data is indicative of a contour of at least one of an outside mold line of the manufactured part and an inside mold line of the manufactured part.

16. The system of claim 14, in which the scanned data is indicative of a thickness of the manufactured part.

17. The system of claim 13, in which the comparator module is further configured to determine whether the modeled reaction forces needed to obtain the modified computer model exceed a reaction force threshold, and designate the manufactured part for rework when the modeled reaction forces exceed the reaction force threshold.

18. The system of claim 13, in which the computer modeling module comprises a CAD module configured to create a finite element analysis model of the model surface formed in the desired assembled model contour and the model feature located at the desired assembled location on the model surface.

19. The system of claim 13, in which the manufactured part comprises an aircraft wing skin, and in which the actual configuration comprises a hanging configuration of the aircraft wing skin.

* * * * *